(12) United States Patent
Iseli et al.

(10) Patent No.: US 10,203,026 B2
(45) Date of Patent: Feb. 12, 2019

(54) COORDINATE MEASURING MACHINE WITH AN IMPROVED BELT DRIVE

(71) Applicant: HEXAGON TECHNOLOGY CENTER GMBH, Heerbrugg (CH)

(72) Inventors: Claudio Iseli, Au (CH); Bernhard Sprenger, Widnau (CH); Alberto Tarizzo, Turin (IT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 134 days.

(21) Appl. No.: 15/468,071

(22) Filed: Mar. 23, 2017

(65) Prior Publication Data

US 2017/0276220 A1 Sep. 28, 2017

(30) Foreign Application Priority Data

Mar. 23, 2016 (EP) .................................. 16162061

(51) Int. Cl.
| | | |
|---|---|---|
| G01B 5/00 | (2006.01) | |
| F16H 19/06 | (2006.01) | |
| G01B 21/04 | (2006.01) | |
| G01B 5/008 | (2006.01) | |
| F16H 57/04 | (2010.01) | |

(52) U.S. Cl.
CPC .............. *F16H 19/06* (2013.01); *G01B 5/008* (2013.01); *G01B 5/0009* (2013.01); *G01B 21/04* (2013.01); *F16H 57/0489* (2013.01); *F16H 2019/0686* (2013.01)

(58) Field of Classification Search
CPC .... G01B 5/008; G01B 21/045; G01B 5/0004; G01B 1/00; G01B 21/047; G01B 5/0016; G01B 11/005; G01B 21/04

USPC ........................................................... 33/503
See application file for complete search history.

(56) References Cited

U.S. PATENT DOCUMENTS

| 4,651,426 A | 3/1987 | Band et al. |
| 4,928,396 A * | 5/1990 | Raleigh ................. B23Q 5/385 33/1 M |
| 4,964,221 A * | 10/1990 | Breyer ................. G01B 5/0016 33/1 M |
| 5,758,429 A | 6/1998 | Farzan et al. |

(Continued)

FOREIGN PATENT DOCUMENTS

| CN | 202133387 U | 2/2012 |
| CN | 202648636 U | 1/2013 |

(Continued)

OTHER PUBLICATIONS

European Search Report dated Aug. 16, 2016 as received in Application No. 16162061.2.

*Primary Examiner* — Yaritza Guadalupe
(74) *Attorney, Agent, or Firm* — Maschoff Brennan

(57) ABSTRACT

A coordinate measuring machine (CMM) having a belt drive unit for an elongated axis element of the CMM, the belt drive unit comprising a belt, the ends of which are clamped on the elongated axis element, a pulley unit, comprising a drive pulley and two idler pulleys, wherein the belt entangles the drive pulley and the idle pulleys in an omega-shaped manner, and wherein the pulley unit is configured to cause a relative linear movement between the axis element and the pulley unit, wherein a damping layer is disposed adjacent to the belt.

14 Claims, 2 Drawing Sheets

(56) References Cited

U.S. PATENT DOCUMENTS

Figure 1:
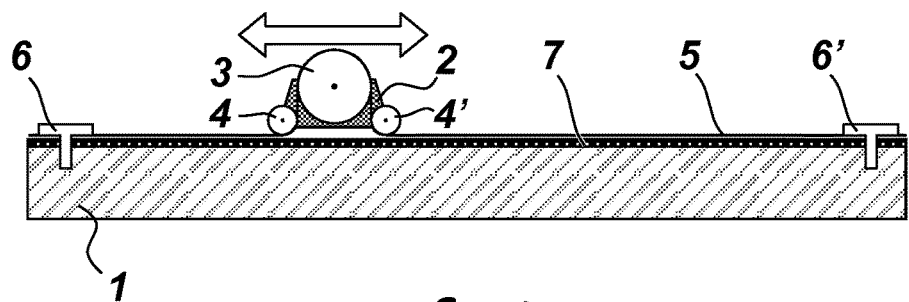

| | | | | |
|---|---|---|---|---|
| 6,058,618 A | * | 5/2000 | Hemmelgarn | G01B 1/00 33/503 |
| 6,176,018 B1 | * | 1/2001 | Wiklund | G01B 5/0002 33/1 M |
| 7,363,181 B2 | * | 4/2008 | Katayama | G01B 21/042 702/85 |
| 2009/0217540 A1 | * | 9/2009 | Garau | G01B 5/0009 33/503 |
| 2009/0265945 A1 | * | 10/2009 | Garau | G01B 5/008 33/503 |
| 2013/0227851 A1 | * | 9/2013 | Singh | G01B 5/008 33/503 |
| 2015/0260499 A1 | * | 9/2015 | Raiteri | G01B 21/047 33/503 |
| 2017/0276220 A1 | * | 9/2017 | Iseli | G01B 5/008 |
| 2018/0149473 A1 | * | 5/2018 | Sprenger | G01B 21/045 |

FOREIGN PATENT DOCUMENTS

| | | |
|---|---|---|
| DE | 39 35 690 A1 | 5/1991 |
| DE | 10 2010 017903 A1 | 10/2011 |
| EP | 2 505 956 A1 | 10/2012 |
| EP | 2 623 923 A1 | 8/2013 |

\* cited by examiner

COORDINATE MEASURING MACHINE WITH AN IMPROVED BELT DRIVE

FIELD OF THE INVENTION

The present invention relates to a belt drive unit for a linear axis of a coordinate measuring machine (CMM).

BACKGROUND

Such coordinate measuring machines comprise at least one high accuracy axis for precisely moving a probe along said axes. Typically, several stages of movement are realized with carriages moving along precision ways on their axis element, for which accordingly a guide and a drive is needed. High precision measurements are taken with the probe and therefore, a crucial requirement to the supporting structure of the CMM comprising the axis elements is constant shape accuracy, and therefore, in particular, distortions of the structure in the area of the axes are to be avoided as they directly cause measurement errors.

Coordinate measuring machines conventionally use mechanical drives, such as ball screws or rack and pinions, for said carriages. Even though these conventional drives offer a good positioning performance, they also require lubrication and maintenance in order to ensure a good durability. That is why, for some time past, belt drives, particularly so called "omega" belt drives are used as they provide good positioning accuracy while also realizing good response time and low wear.

A belt drive for the axes of a coordinate measuring machine is for example known from U.S. Pat. No. 4,651,426. Therein is shown a drive motor which is centrally mounted on a bridge portion overlying the columns of a coordinate measuring machine and which drives a horizontal shaft which extends to each column and effects the rotation of a drive pinion which engages a gear belt which extends parallel to each column and is carried by the column. The drive includes a toothed belt or gear belt which is disposed parallel to the guiding ways for the columns and has its ends firmly clamped on the bridge and an active central portion which extends around a drive pinion which is tensioned on respective sides of the drive pinion by tension rolls. Due to the progress of the belt around the pulleys the drive is also called "omega" drive.

Omega belt drives known from prior art commonly make use of a flexible elastic belt which generates vibrations when being exposed to sudden stress resulting from a fast acceleration or deceleration of the omega carriage. These vibrations cause a loss of precision as they are carried over to the frame of the coordinate measuring machine. Since belts are usually arranged in the air or simply abutting on the structure, the belt is not prevented from pulsating and passing on the vibrations either to the structure directly or via the mounting of the belt.

SUMMARY

Some embodiments of the present invention to provide an omega belt drive with reduced vibrations during its operation.

This improvement is achieved by the drive unit according to claim 2 of the present invention and/or the claims depending on claim 2.

According to the invention, a linear axis element of a coordinate measuring machine, used for driving a driven element—which can for example be a bridge, a further axis element or a measuring probe—by means of an omega belt drive carriage, comprises a damping layer by which the belt of the belt drive is underlaid. The damping layer is spread between the belt and the linear axis at least in those areas where vibration is likely or most critical. Preferably, the belt abuts on the damping layer so that contact is established as soon as possible when the belt is vibrating. Alternatively, the belt may be preloaded, i.e. in contact by default.

Omega belt drives have furthermore the disadvantage that by means of the clamped belt, one side of the axis element is under tensile stress, whereas the other side is not, and therefore the axis element tends to deform which challenges the demanded precision of coordinate measuring machines.

In DE 10 2010 017 903, a solution to this problem is offered wherein the other side of the axis element is preloaded by a spring element. This attempt, however, has the downside that over time and within a temperature range, the prestress of the belt fluctuates, or decreases in particular, which is why the effect of a constant shape accuracy of the axis cannot be ensured. It is therefore an aspect of the present invention to provide an omega belt drive with an improved force distribution caused by the preloaded belt.

This improvement is achieved by the drive unit according to claim 1 of the present invention and/or the claims depending on claim 1.

According to the invention, a linear axis element of a coordinate measuring machine, used for driving a driven element—which can for example be a bridge, a further axis element or a measuring probe—by means of an omega belt drive carriage, is entangled by the belt of the belt drive. Because of the fixture of the belt, the axis is exposed to a self-balancing stress distribution. The points of force application are located in such a way that no—or effectively no—bending moment is acting on the axis. With help of a low-friction support for the belt, thermal expansion can immediately distribute evenly over the full extent of the entanglement.

Specifically, the belt according to the invention at least partly embracing its axis element is combinable with a vibration-damping layer arranged underneath the belt. The linear axis element used for driving the driven element by means of an omega belt drive carriage, comprises furthermore a damping layer by which the belt of the belt drive is underlaid. The damping layer is spread between the belt and the linear axis at least in those areas where vibration is likely or most critical. Preferably, the belt abuts on the damping layer so that contact is established as soon as possible when the belt is vibrating. Alternatively, the belt may be preloaded, i.e. in contact by default.

Above described embodiments can as well be configured so that the axis element is the driven part and the omega belt drive carriage stands still.

The invention relates to a coordinate measuring machine (CMM) having a belt drive unit for an elongated axis element of the CMM, the belt drive unit comprising a belt, the ends of which are clamped on the elongated axis element, a pulley unit, comprising a drive pulley and two idler pulleys, wherein the belt entangles the drive pulley and the idle pulleys in an omega-shaped manner, and wherein the pulley unit is configured to cause a relative linear movement between the axis element and the pulley unit, wherein a damping layer is disposed adjacent to the belt, in particular wherein the damping layer is arranged between the belt and the axis element.

The invention further relates to a coordinate measuring machine (CMM) having a belt drive unit for an elongated axis element of the CMM, the belt drive unit comprising a belt, the ends of which are clamped on the elongated axis element, a pulley unit, comprising a drive pulley and two idler pulleys, wherein the belt entangles the drive pulley and the idle pulleys in an omega-shaped manner, and wherein the pulley unit is configured to cause a relative linear movement between the axis element and the pulley unit, wherein the belt encompasses at least one end of the elongated axis element.

In an embodiment of the CMM according to the invention, the belt is a profiled belt, in particular a toothed belt.

In a further embodiment of the CMM according to the invention, the belt encompasses the axis element in such a way that forces resulting from the prestressing of the belt which are acting on the axis element essentially neutralize themselves with regard to an overall bending moment of the axis element.

In a further embodiment of the CMM according to the invention, the ends of the belt are clamped in two separate clamping points by fixture means.

In a further embodiment of the CMM according to the invention, the ends of the belt are clamped in one clamping point by a fixture means.

In a further embodiment of the CMM according to the invention, at an end of the axis element, the belt is guided by a support pulley and/or an air bearing. In one embodiment, the belt is guided by a bush bearing with or without lubrication.

In a further embodiment of the CMM according to the invention, a damping layer is disposed adjacent to the belt, in particular wherein the damping layer is arranged between the belt and the axis element.

In a further embodiment of the CMM according to the invention, the material of the damping layer is rubber or foamed plastic.

DETAILED DESCRIPTION

Figure 2:
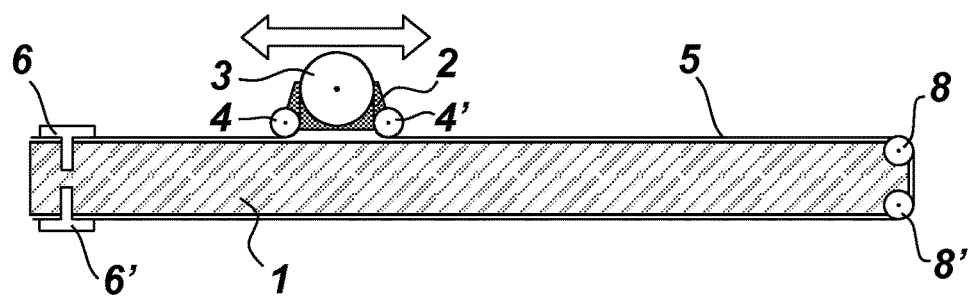
Figure 3:
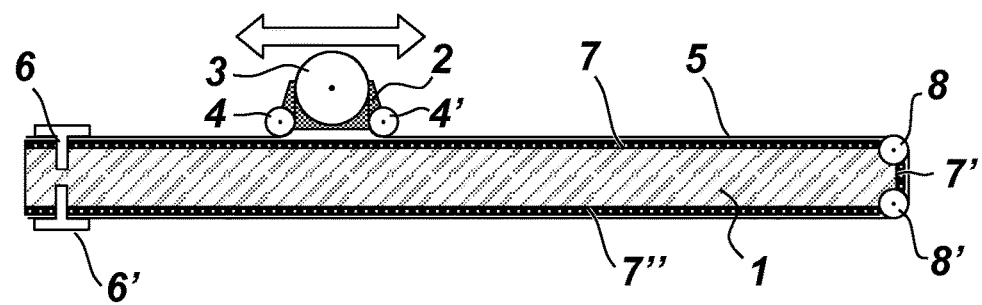
Figure 4:
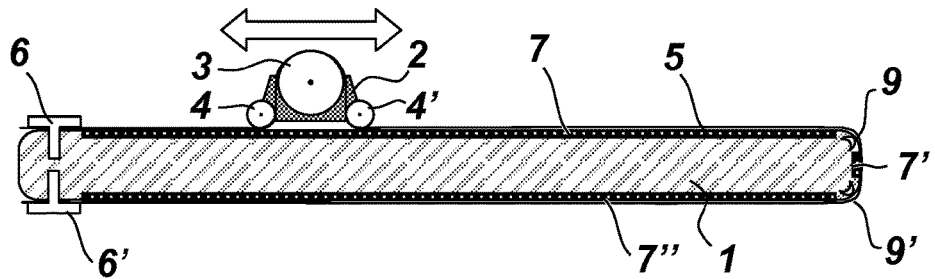
Figure 5:
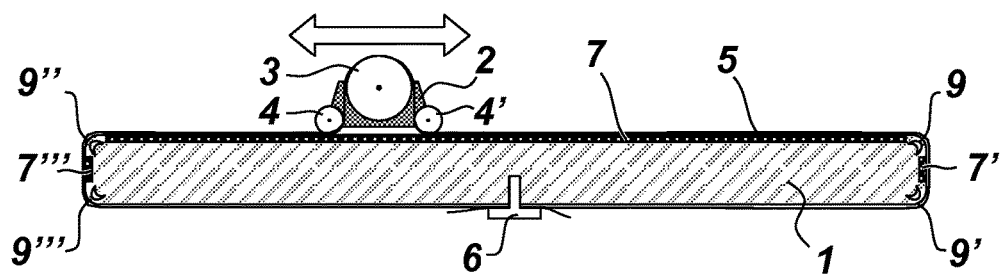
Figure 6:
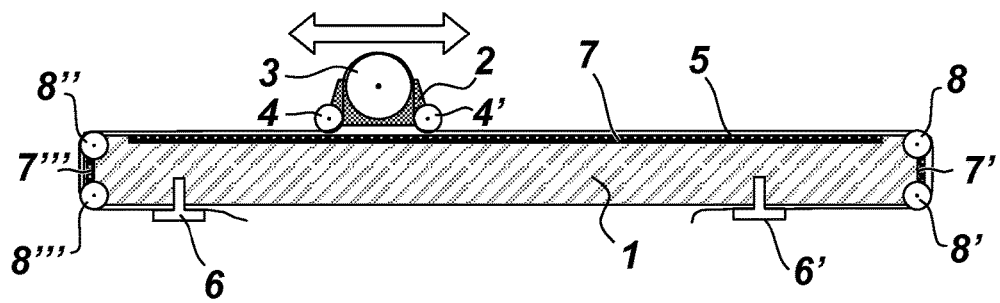

In the following, the invention will be described in detail by referring to exemplary embodiments that are accompanied by figures, in which:

FIG. 1: shows an omega belt drive with vibration damping as one embodiment according to the invention;

FIG. 2: shows an omega belt drive with bending moment compensation as an embodiment according to the invention;

FIG. 3: shows an omega belt drive with bending moment compensation and vibration damping as an embodiment according to the invention;

FIG. 4: shows a further omega belt drive with bending moment compensation and vibration damping as another embodiment according to the invention;

FIG. 5: shows a further omega belt drive with bending moment compensation and vibration damping as another embodiment according to the invention;

FIG. 6: shows a further omega belt drive with bending moment compensation and vibration damping as another embodiment according to the invention;

As a first embodiment of the invention, FIG. 1 shows an axis element 1, a pulley unit 2 comprising a drive pulley 3 and two idler pulleys 4 and 4'. A belt 5 is clamped under tension preloading on the axis element 1 via two fixture means 6 and 6'. As illustrated by the arrow, the pulley unit 2 is movable forth and back by the drive pulley 3 rotating and thereby pulling its way along the axis element 1 by maintaining grip with the belt 5. This grip may be realized by a tight fit, for example by the belt being a profiled belt, particularly a toothed belt, on its lower side facing the axis element 1. The upper surface may be flat or also profiled. A tight fit on this side with the idler pulleys 4 and 4', however, is not necessary, since they merely provide an inner prestress support for the pulley unit 2 against the drive pulley 3.

A guiding of the pulley unit 2 is not shown and may be realized by a further section of the axis element.

A damping layer 7 is arranged between the belt 5 and the axis element 1, wherein the material of the layer may be of a type of rubber or foam. The damping layer 7 may be fixed directly and firmly on the axis element. Relative movement between belt 5 and layer 7 has to be provided, since the layer 7 "swallows" or reduces vibrations of the belt. Between belt 5 and damping layer 7 there may be an air gap, as is shown in FIG. 1, or both elements may be abutted against each other, for example by the fixture means 6 and 6'.

FIG. 2 shows an axis element 1, a pulley unit 2 comprising a drive pulley 3 and two idler pulleys 4 and 4'. A belt 5 is clamped under tension preloading on the axis element 1 via two fixture means 6 and 6', wherein the belt is wrapped around the axis element. As illustrated by the arrow, the pulley unit 2 is movable forth and back by the drive pulley 3 rotating and thereby pulling its way along the axis element 1 by maintaining grip with the belt 5. This grip may be realized by a tight fit, for example by the belt being a profiled belt, particularly a toothed belt, on its lower side facing the axis element 1. The upper surface may be flat or also profiled. A tight fit on this side with the idler pulleys 4 and 4', however, is not necessary, since they merely provide an inner prestress support for the pulley unit 2 against the drive pulley 3.

A guiding of the pulley unit 2 is not shown and may be realized by a further section of the axis element.

In this configuration, on the edges of the axis element 1 the belt is supported by support pulleys 8 and 8'. With this support/bearing, the belt is free to expand, contract or slacken, respectively. The wrap-around of the belt about one of the ends of the axis element provides the resulting forces caused by the pretension of the belt to attack in such a way that a bending moment of the axis element is zero or essentially zero.

Even though pulley unit 2 is configured to drive only on the upper side of the elongated axis element 1, the belt is carried on to the lower side where it is clamped by fixture means 6'. The distance between fixture means 6' and support pulley 8' is arbitrary and may e.g. be maximized, as shown in FIGS. 2, 3 and 4, in order to achieve a higher overall elasticity of the belt. Since the belt is frictionless carried on to the lower elongated side of the axis element, it is of no meaning where on the lower side the belt is clamped in order to achieve the zero-sum bending moment of the axis element.

FIG. 3 shows an enhanced embodiment of the CMM axis element from FIG. 2. Here, the belt 5 is underlaid by damping layers 7, 7', and 7" in order to absorb vibrations of the belt. Between the belt and the damping layer there may be an air gap, or the belt may abut on the damping layer. Anyhow, with the support pulleys 8 and 8' the belt is given chance to compensate the preload stressing distribution, so that forces acting on the support pulleys 8 and 8' are essentially equal in both direction and amount.

FIG. 4 shows a configuration of a CMM axis element, on the edges of which the belt is supported by air bearings 9 and 9'. With this support/bearing, the belt is free to expand, contract or slacken, respectively. The wrap-around of the belt about one of the ends of the axis element provides the resulting forces caused by the pretension of the belt to attack in such a way that a bending moment of the axis element is zero or essentially zero.

FIG. 5 shows a further embodiment of a CMM axis element according to the invention, wherein the belt 5 is clamped in only one clamping point by fixture means 6. On the edges of the axis element, the belt is supported by air cushion bearings 9, 9', 9", and 9'".

FIG. 6 shows a further embodiment of a CMM axis element according to the invention, wherein the belt 5 is clamped in two separate clamping points by fixture means 6 and 6'. Guiding of the belt at the edges of the axis element 1 now is realized by support pulleys 8, 8', 8", and 8'".

Although the invention is illustrated above, partly with reference to some preferred embodiments, it must be understood that numerous modifications and combinations of different features of the embodiments can be made. All of these modifications lie within the scope of the appended claims.

The invention claimed is:

1. A coordinate measuring machine (CMM) having a belt drive unit for an elongated axis element of the CMM, the belt drive unit comprising:
    a belt, the ends of which are clamped on the elongated axis element;
    a pulley unit comprising a drive pulley and two idler pulleys,
    wherein the belt entangles the drive pulley and the idle pulleys in an omega-shaped manner,
    wherein the pulley unit is configured to cause a relative linear movement between the axis element and the pulley unit, and
    wherein the belt encompasses at least one end of the elongated axis element.

2. A coordinate measuring machine (CMM) according to claim 1, wherein the belt is a profiled belt.

3. A coordinate measuring machine (CMM) according to claim 1, wherein the belt is a toothed belt.

4. The coordinate measuring machine (CMM) according to claim 1, wherein the belt encompasses the axis element such that forces resulting from the prestressing of the belt which are acting on the axis element substantially neutralize themselves with regard to an overall bending moment of the axis element.

5. A coordinate measuring machine (CMM) according to claim 1, wherein the ends of the belt are clamped in two separate clamping points by a fixture means.

6. The coordinate measuring machine (CMM) according to claim 1, wherein the ends of the belt are clamped in one clamping point by a fixture means.

7. A coordinate measuring machine (CMM) according to claim 1, wherein at an end of the axis element, the belt is guided by a support pulley.

8. The coordinate measuring machine (CMM) according to claim 1, wherein at an end of the axis element, the belt is guided by an air bearing.

9. The coordinate measuring machine (CMM) according to claim 1, wherein at an end of the axis element, the belt is guided by a bush bearing with or without lubrication.

10. A coordinate measuring machine (CMM) having a belt drive unit for an elongated axis element of the CMM, the belt drive unit comprising:
    a belt, the ends of which are clamped on the elongated axis element;
    a pulley unit, comprising a drive pulley and two idler pulleys; and
    a damping layer disposed adjacent to the belt,
    wherein the belt entangles the drive pulley and the idle pulleys in an omega-shaped manner, and
    wherein the pulley unit is configured to cause a relative linear movement between the axis element and the pulley unit.

11. The coordinate measuring machine (CMM) according to claim 10, wherein the damping layer is disposed adjacent to the belt.

12. The coordinate measuring machine (CMM) according to claim 11, wherein the damping layer is arranged between the belt and the axis element.

13. The coordinate measuring machine (CMM) according to claim 10, wherein the material of the damping layer is rubber.

14. The coordinate measuring machine (CMM) according to claim 10 wherein the material of the damping layer is foamed plastic.

* * * * *